(12) United States Patent
Lee

(10) Patent No.: US 12,315,487 B2
(45) Date of Patent: May 27, 2025

(54) APPARATUS AND METHOD FOR PREDICTING ACCELERATION SIGNAL

(71) Applicant: HYUNDAI MOBIS CO., LTD., Seoul (KR)

(72) Inventor: Jae Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 372 days.

(21) Appl. No.: 18/146,922

(22) Filed: Dec. 27, 2022

(65) Prior Publication Data

US 2023/0377553 A1 Nov. 23, 2023

(30) Foreign Application Priority Data

May 18, 2022 (KR) .................. 10-2022-0060768

(51) Int. Cl.
| | |
|---|---|
| *G10K 11/178* | (2006.01) |
| *B60W 50/00* | (2006.01) |
| *B60W 50/06* | (2006.01) |

(52) U.S. Cl.
CPC ..... *G10K 11/1785* (2018.01); *B60W 50/0097* (2013.01); *B60W 50/06* (2013.01); *B60W 2050/0044* (2013.01); *B60W 2050/0048* (2013.01); *G10K 2210/12821* (2013.01); *G10K 2210/3047* (2013.01)

(58) Field of Classification Search
CPC ..... G10K 11/1785; G10K 2210/12821; G10K 2210/3047; B60W 50/0097; B60W 50/06; B60W 2050/0044; B60W 2050/0048
USPC ....................................... 381/74.1
See application file for complete search history.

(56) References Cited

U.S. PATENT DOCUMENTS

| | | | |
|---|---|---|---|
| 10,410,620 B1* | 9/2019 | Hein ............... | G10K 11/17835 |
| 12,217,733 B2* | 2/2025 | Feng ............... | G10K 11/17854 |
| 2019/0043470 A1* | 2/2019 | Terashima ....... | G10K 11/17883 |
| 2019/0270350 A1* | 9/2019 | Bastyr ............. | G10K 11/1781 |
| 2022/0208164 A1* | 6/2022 | Aval ............... | G10K 11/17883 |
| 2023/0206891 A1* | 6/2023 | You ................. | H04R 9/06 |
| | | | 381/55 |

(Continued)

FOREIGN PATENT DOCUMENTS

| | | | |
|---|---|---|---|
| CN | 114582312 A | * | 6/2022 |
| KR | 10-2007-0093519 | | 9/2007 |

OTHER PUBLICATIONS

English Language Abstract of KR 10-2007-0093519 published Sep. 19, 2007.

*Primary Examiner* — David L Ton
(74) *Attorney, Agent, or Firm* — DLA PIPER LLP US

(57) ABSTRACT

An apparatus for predicting an acceleration signal predicts an acceleration signal of an acceleration sensor installed on a vehicle for active noise control (ANC) and includes: a prediction module configured to train a predefined prediction algorithm to predict an acceleration signal after N samples compared to a point in time at which an acceleration signal is acquired by the acceleration sensor (N is a natural number), and to apply a reference acceleration signal acquired at a reference point in time to the completely trained prediction algorithm to generate a predicted acceleration signal after the N samples compared to the reference point in time; and an ANC module configured to perform ANC on the basis of the predicted acceleration signal generated by the prediction module.

16 Claims, 7 Drawing Sheets

(56) References Cited

U.S. PATENT DOCUMENTS

2023/0317050 A1\* 10/2023 Wang ............... G10K 11/17815
381/71.4

\* cited by examiner

APPARATUS AND METHOD FOR PREDICTING ACCELERATION SIGNAL

CROSS-REFERENCE TO RELATED APPLICATION

This application claims priority from and the benefit of Korean Patent Application No. 10-2022-0060768, filed on May 18, 2022, which is hereby incorporated by reference for all purposes as if set forth herein.

BACKGROUND

Field

Exemplary embodiments of the present disclosure relate to an apparatus and a method for predicting an acceleration signal, and more particularly, to an apparatus and a method for predicting an acceleration signal, which are used for active noise control (ANC).

Discussion of the Background

In general, an active road noise reduction method such as road-noise active noise control (R-ANC) is used to reduce road noise generated when a tire contacts a road surface. As illustrated in FIG. 1, an R-ANC system operates to measure vibration transmitted from a road surface to a vehicle through an acceleration sensor, analyze the type and magnitude of noise, and then output a cancellation sound wave signal to block the noise. That is, the R-ANC system operates to output a cancellation sound wave signal having an arbitrary phase matching an input value of the acceleration sensor, measure vehicle interior noise through a microphone, maintain the currently output cancellation sound wave signal when the magnitude of the vehicle interior noise decreases, and change the amplitude and phase of the cancellation sound wave signal when the level of destructive interference to the road noise is not large.

Since it generally takes about 9 ms for road noise to reach an occupant, the R-ANC system reduces the level of vehicle interior noise by generating and outputting a cancellation sound wave signal before the road noise reaches the occupant. Accordingly, the R-ANC system noise may effectively reduce without increasing the weight of a vehicle body compared to a method using a separate sound absorbing material or soundproofing material. In addition, in the case of electric vehicles, the level of road noise is relatively high because there is no engine noise. Accordingly, using an active road noise reduction method may contribute to providing a more quiet and eco-friendly vehicle, so the application of the active road noise reduction method to the R-ANC system is on the rise.

The background art of the present disclosure is disclosed in Korean Patent Application Laid-Open No. 10-2007-0093519 (published on Sep. 19, 2007).

SUMMARY

As illustrated in FIG. 2, road noise is distributed over all frequency bands, and since sound generated by tires is transmitted to the air in the frequency region of 500 Hz or higher, a road noise reduction method using an acceleration sensor aims to reduce signals in a 30 Hz to 500 Hz band. However, in the case of a high frequency band of 350 Hz or higher, since the prediction of the time for which vibration is converted into sound waves and the sound waves reach an occupant is not accurate and a phase change over time is large, constructive interference rather than destructive interference may occur. Therefore, the noise reduction effect is insignificant.

Recently, in order to improve the cancellation effect on a high frequency signal, methods such as predicting the high frequency signal by using a filter or shortening the arrival time of sound waves by installing a speaker on a headrest have been devised. However, the filter-based high-frequency signal prediction method is usually optimized for magnitude estimation, so phase accuracy is not high, and in the case of a headrest speaker, there is a problem in that cost increases because hardware is additionally used.

In addition, the typical R-ANC system uses a closed loop control method of monitoring the level of vehicle interior noise by using speakers, and a high-frequency component signal with high variability is not easily cancelled through the closed loop control with slow response.

Various embodiments are directed to an apparatus and a method for predicting an acceleration signal, in which an acceleration signal after a certain period of time is predicted based on an acceleration signal currently input from an acceleration sensor and R-ANC is performed to improve the slow response of the R-ANC to road noise having a high frequency component, thereby effectively removing vehicle interior noise.

In an embodiment, an apparatus for predicting an acceleration signal predicts an acceleration signal of an acceleration sensor installed on a vehicle for active noise control (ANC) and includes: a prediction module configured to train a predefined prediction algorithm to predict an acceleration signal after N samples compared to a point in time at which an acceleration signal is acquired by the acceleration sensor (N is a natural number), and to apply a reference acceleration signal acquired at a reference point in time to the completely trained prediction algorithm to generate a predicted acceleration signal after the N samples compared to the reference point in time; and an ANC module configured to perform ANC on the basis of the predicted acceleration signal generated by the prediction module.

In the present disclosure, the N samples may indicate a time required for road surface vibration reflected in the acceleration signal to be converted into sound waves and for the sound waves to reach an interior of the vehicle.

In the present disclosure, the prediction module may delay a current acceleration signal obtained at a current point in time by the N samples, input the delayed current acceleration signal to the prediction algorithm, and train the predefined prediction algorithm by comparing an output acceleration signal output from the prediction algorithm with the current acceleration signal.

In the present disclosure, the prediction module may train the prediction algorithm through a method of updating a weight of the prediction algorithm so that an error parameter between the current acceleration signal and the output acceleration signal output from the prediction algorithm is reduced, on the basis of stochastic gradient descent (SGD).

In the present disclosure, before the ANC is performed by the ANC module, the prediction module may verify a degree of learning of the prediction algorithm by delaying, by the N samples, the predicted acceleration signal output as the reference acceleration signal is input to the prediction algorithm and calculating an error parameter between the delayed signal and the reference acceleration signal.

In the present disclosure, the ANC module may generate a cancellation sound wave for canceling road noise reflected in the reference acceleration signal on the basis of the predicted acceleration signal, and output the generated cancellation sound wave.

In the present disclosure, at a point in time at which a value of k has reached a value of K (K is a natural number greater than k) with the repetitive execution of a learning process in which the prediction module sets an initial value of N to k to train the prediction algorithm (k is a natural number), a generation process in which the prediction module generates the prediction acceleration signal on the basis of the completely trained prediction algorithm, an ANC process in which the ANC module performs the ANC on the basis of the predicted acceleration signal, and a process in which the value of k is increased, a value of k corresponding to noise whose magnitude is the smallest among vehicle interior noises acquired in the ANC process may be determined as a value of N.

In the present disclosure, the prediction algorithm may be implemented by a long short term memory (LSTM) auto encoder.

In an embodiment, a method for predicting an acceleration signal predicts an acceleration signal of an acceleration sensor installed on a vehicle for active noise control (ANC) and includes: a step in which a prediction module trains a predefined prediction algorithm to predict an acceleration signal after N samples compared to a point in time at which an acceleration signal is acquired by the acceleration sensor (N is a natural number); a step in which the prediction module applies a reference acceleration signal acquired at a reference point in time to the completely trained prediction algorithm to generate a predicted acceleration signal after the N samples compared to the reference point in time; and a step in which an ANC module performs ANC on the basis of the generated predicted acceleration signal.

In accordance with an aspect of the present disclosure, the present disclosure predicts an acceleration signal on the basis of a prediction algorithm such as LSTM auto encoder and performs R-ANC, thereby ensuring the fast response of the R-ANC to changes in high-frequency component signals of 350 Hz or higher and improving vehicle quietness without additional hardware cost. Furthermore, even though vibration characteristics change according to the aging of a vehicle adopting the present disclosure or the type of vehicle adopting the present disclosure changes, the present disclosure uses a method of optimizing the number of samples of acceleration signals to be predicted, thereby providing advantages in terms of application scalability and enabling self-maintenance of an active road noise reduction function.

DETAILED DESCRIPTION OF THE ILLUSTRATED EMBODIMENTS

Figure 1:
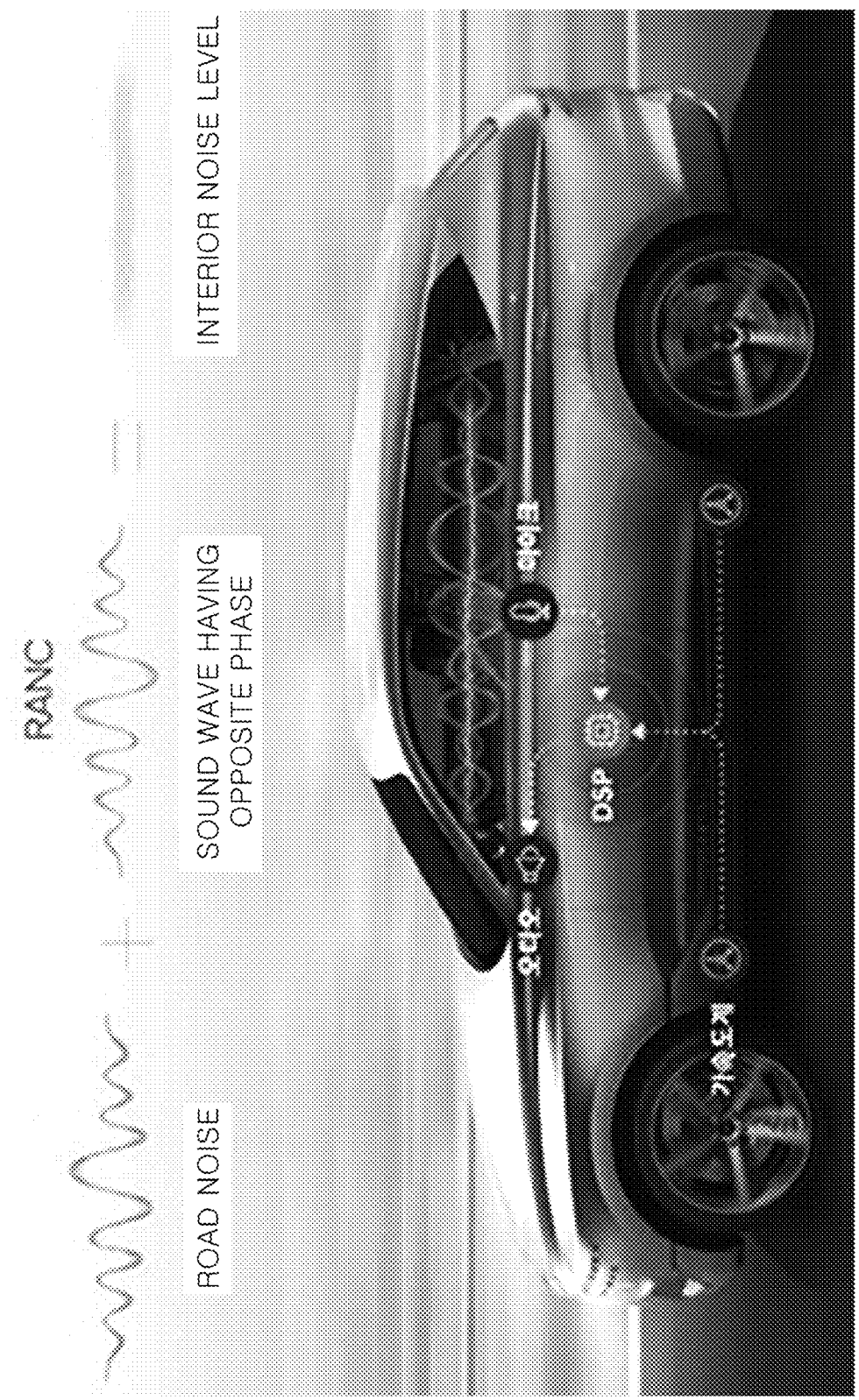
FIG. 1 is an exemplary diagram illustrating an active noise reduction method in the related art.
Figure 2:
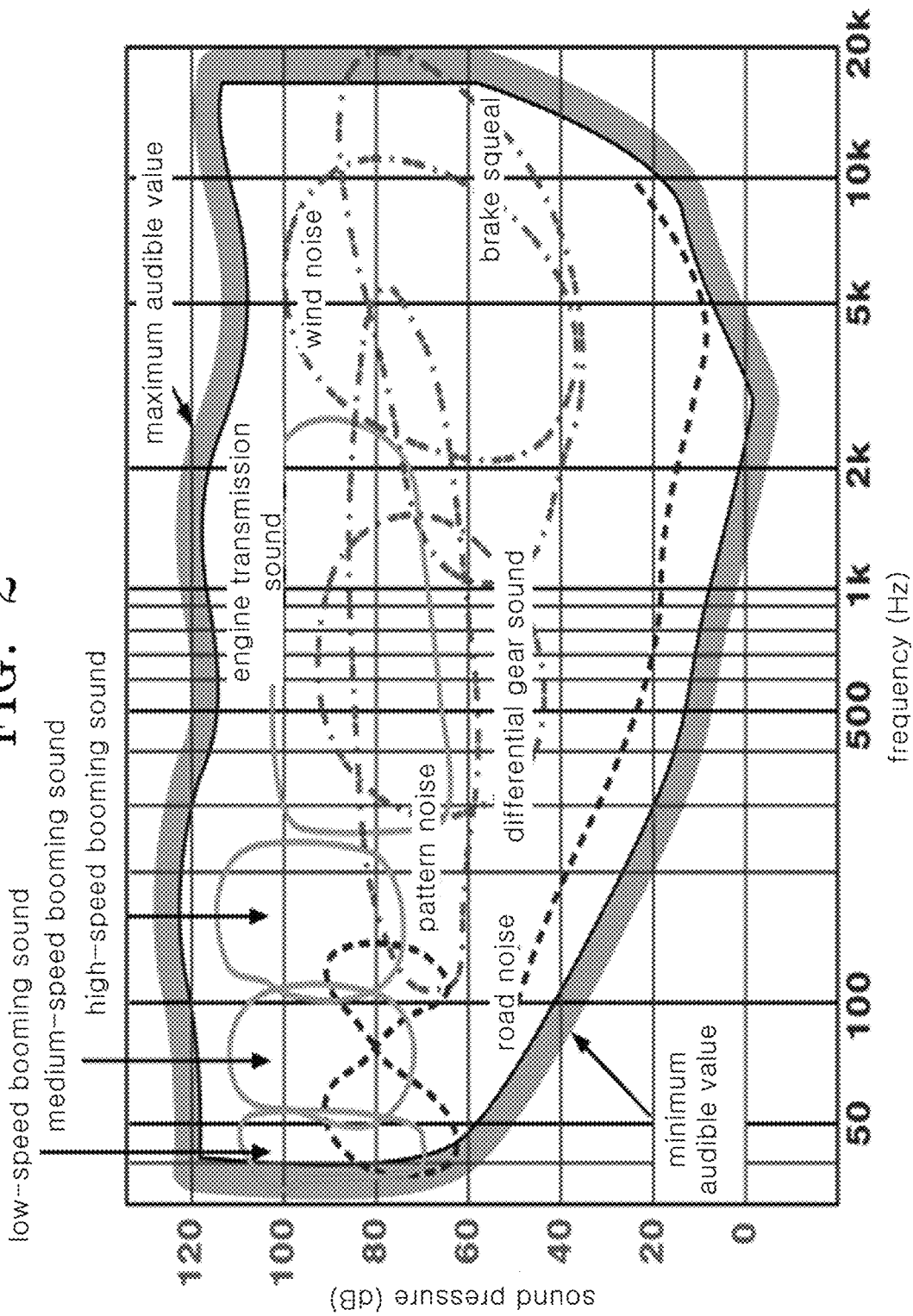
FIG. 2 is an exemplary diagram illustrating a frequency band of road noise.

Hereinafter, an apparatus and a method for predicting an acceleration signal will be described with reference to the accompanying drawings through various exemplary embodiments. In this process, the thicknesses of lines or the sizes of elements illustrated in the drawings may be exaggerated for the purpose of clarity and convenience of explanation. Furthermore, terms to be described later are terms defined in consideration of functions thereof in the present disclosure and may be changed according to the intention of a user or an operator, or practice. Accordingly, such terms should be defined based on the disclosure over the present specification.

Figure 3:
FIG. 3 is an exemplary diagram illustrating an installation structure of acceleration sensors, speakers, and microphones in an apparatus for predicting an acceleration signal in accordance with the present embodiment.
Figure 4:
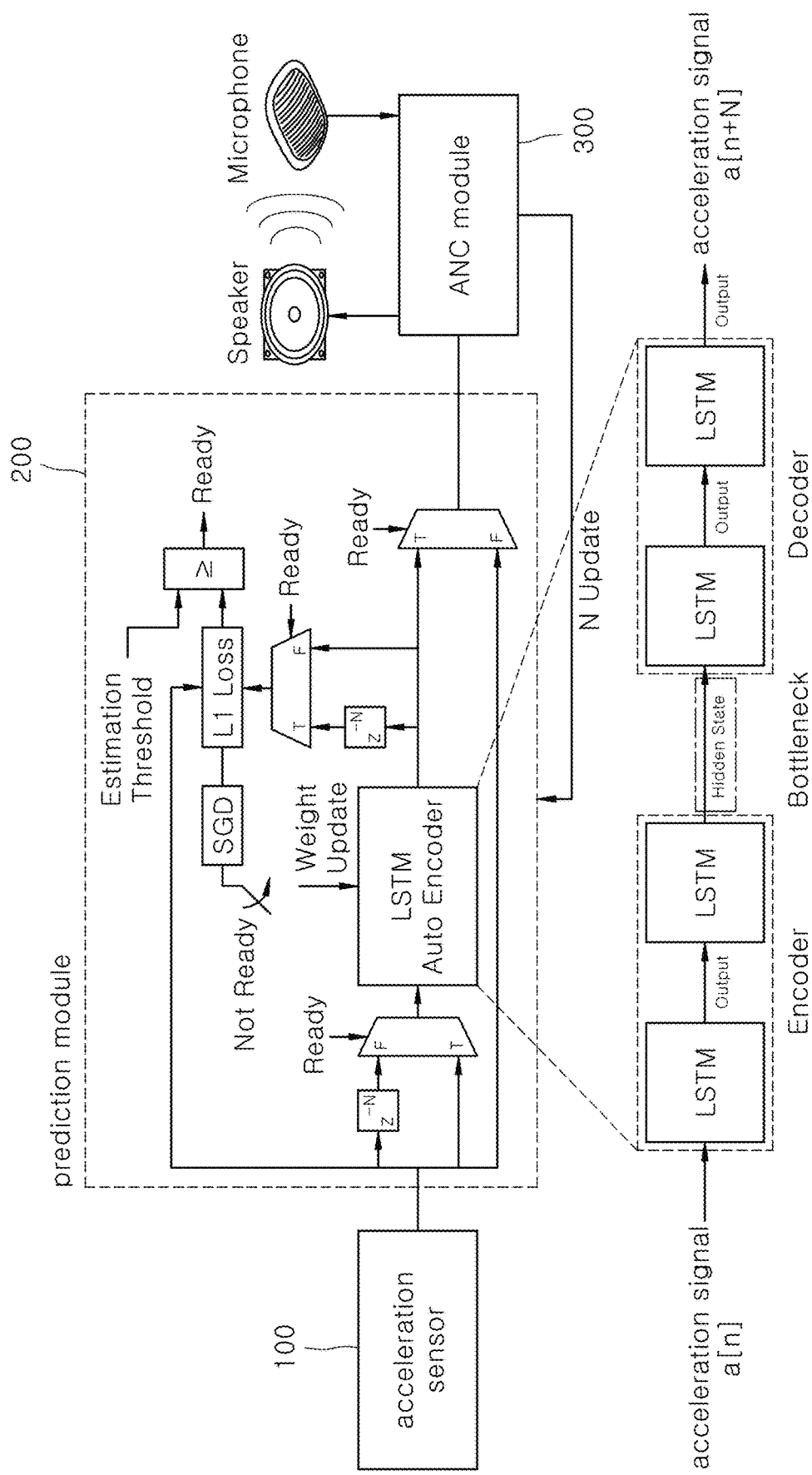
FIG. 4 is a block diagram illustrating the apparatus for predicting an acceleration signal in accordance with the present embodiment.

FIG. 3 is an exemplary diagram illustrating an installation structure of acceleration sensors, speakers, and microphones in an apparatus for predicting an acceleration signal in accordance with the present embodiment, and FIG. 4 is a block diagram illustrating the apparatus for predicting an acceleration signal in accordance with the present embodiment.

First, in the present embodiment, an acceleration sensor 100 may operate to measure vibration transmitted from a road surface to a vehicle, and may be installed on a vehicle body near wheels in the front, rear, left, and right directions as illustrated in FIG. 3 (the present embodiment will be described as targeting any one of four acceleration sensors). Speakers and microphones serve as components for outputting cancellation sound wave signals and measuring vehicle interior noise in order to perform an ANC function. As illustrated in FIG. 3, the speakers may include five speakers respectively installed on the front left, front right, rear left, rear right, and rear sides of the vehicle, and the microphones may include four microphones respectively installed on the front left, front right, rear left, and rear sides of the vehicle. However, the structure of FIG. 3 is merely an example, and the installation locations and the number of speakers and microphones may be designed in various ways within the range of performing the ANC function.

An operation of the present embodiment will be described in more detail with reference to FIG. 4. The apparatus for predicting an acceleration signal in accordance with the present embodiment may include a prediction module 200 and an ANC module 300.

The prediction module 200 may train a predefined prediction algorithm to predict an acceleration signal after N samples compared to the point in time at which an acceleration signal is acquired by the acceleration sensor 100 (N is a natural number), and apply a reference acceleration signal acquired at a reference point in time to the completely trained prediction algorithm to generate a predicted acceleration signal after the N samples compared to the reference point in time. As the above-described prediction algorithm, a long short term memory (LSTM) auto encoder may be employed. The above-described N samples indicate the time required for road surface vibration reflected in the acceleration signal to be converted into sound waves and for the sound waves to reach the interior of the vehicle. That is, in the present embodiment, the acceleration signal after the N samples, which corresponds to the time required for noise due to the road surface vibration to reach the vehicle interior is predicted based on a current acceleration signal, and R-ANC is performed, thereby making it possible to ensure the fast response of the R-ANC even to large changes in a high-frequency component signal.

First, a learning process for the prediction algorithm will be described. The prediction module 200 may delay, by the N samples, a current acceleration signal obtained at the current point in time (that is, advances the current acceleration signal by the N samples) (according to the practical terminology in this technical field, 'delay' will be described as meaning a state in which time has advanced), input the delayed current acceleration signal to the prediction algorithm, and train the prediction algorithm by comparing an output acceleration signal output from the prediction algorithm with the current acceleration signal.

In order to quantitatively evaluate the prediction accuracy of the prediction algorithm when comparing the current acceleration signal with the output acceleration signal, L1 Loss may be employed as an error parameter between the current acceleration signal and the output acceleration signal. In the present embodiment, L1 Loss may be expressed by Equation 1 below.

$$L1\ \text{Loss} = \sum_{i=1}^{m} |a[n]_i - f(a[n-N])_i| \quad \text{Equation 1}$$

In Equation 1 above, a[n] denotes the current acceleration signal, f( ) denotes a processing function of the prediction algorithm (that is, the LSTM auto encoder), and f(a[n−N]) denotes an output acceleration signal output from the prediction algorithm after a signal a[n−N] obtained by delaying the current acceleration signal a[n] by the N samples is input to the prediction algorithm. n denotes a notation indicating the current point in time, and i and m denote notations indicating the number of times by which L1 loss is calculated.

Accordingly, the prediction module 200 may train the predefined prediction algorithm through a method of updating a weight of the prediction algorithm (that is, a weight of the LSTM auto encoder) so that the error parameter (that is, L1 Loss) between the current acceleration signal and the output acceleration signal output from the prediction algorithm is reduced, on the basis of stochastic gradient descent (SGD). In such a case, when the error parameter is equal to or less than a preset threshold Estimation Threshold, the learning of the prediction algorithm may be completed. The above learning process corresponds to a process for predicting a change in the acceleration signal for next N samples on the basis of the current acceleration signal, and accordingly, unsupervised learning is possible as illustrated in FIG. 4.

When the learning of the prediction algorithm is completed, the prediction module 200 may apply a reference acceleration signal (marked as a 'reference' acceleration signal in order to be distinguished from the above-described current acceleration signal) acquired at a reference point in time (that is, the current point in time at which the predicted acceleration signal is generated) to the completely trained prediction algorithm, and generate the predicted acceleration signal after the N samples compared to the reference point in time.

Prior to performing ANC on the basis of the predicted acceleration signal generated above, the prediction module 200 may preferentially verify the degree of learning of the prediction algorithm on the basis of the predicted acceleration signal. Specifically, the prediction module 200 may verify the degree of learning of the prediction algorithm through a method of delaying, by the N samples, the predicted acceleration signal output as the reference acceleration signal is input to the prediction algorithm and calculating an error parameter between the delayed signal and the reference acceleration signal. As in the above description, L1 loss may be employed as the error parameter, and L1 loss in the process of verifying the degree of learning of the prediction algorithm may be expressed by Equation 2 below.

$$L1\ \text{Loss} = \sum_{i=1}^{m} |a[n]_i - f(a[n])[n-N]_i| \quad \text{Equation 2}$$

In Equation 2 above, a[n] denotes the predicted acceleration signal, f( ) denotes the processing function of the prediction algorithm (that is, the LSTM auto encoder), and f(a[n])[n−N] denotes a signal obtained by delaying the predicted acceleration signal f(a[n]) by the N samples. n denotes a notation indicating the current point in time, and i and m denote notations indicating the number of times by which L1 loss is calculated.

That is, the learning process of the prediction algorithm uses a method of delaying the current acceleration signal by the N samples according to Equation 1 above, inputting the delayed signal to the prediction algorithm, and then comparing the output acceleration signal with the current acceleration signal. The process of verifying the prediction algorithm uses a method of delaying the output acceleration signal (that is, the above predicted acceleration signal) by the N samples according to Equation 2 above and then comparing the delayed signal with the input signal of the prediction algorithm (that is, the above reference acceleration signal).

When the error parameter according to Equation 2 above is equal to or less than the preset threshold Estimation Threshold, it may be determined that the degree of learning of the prediction algorithm has been verified, and then the ANC module 300 may perform ANC (that is, R-ANC) on the basis of the predicted acceleration signal generated by the prediction module 200. In such a case, the ANC module 300 may generate a cancellation sound wave for canceling road noise reflected in the reference acceleration signal on the basis of the predicted acceleration signal, output the generated cancellation sound wave through a speaker, and maintain the current cancellation sound wave output state when vehicle interior noise measured through the microphone is equal to or less than the preset threshold Estimation Threshold. When the vehicle interior noise exceeds the threshold Estimation Threshold, the ANC module 300 may regenerate the cancellation sound wave by adjusting the magnitude and phase of the cancellation sound wave and then output the regenerated cancellation sound wave through the speaker. The above operation is repeated until the vehicle interior noise is equal to or less than the threshold Estimation Threshold.

Meanwhile, since the time required for road surface vibration to be converted into sound waves and for the sound waves to reach the vehicle interior varies depending on the vehicle structure or the performance of a processor, the optimal number of prediction samples (that is, a value of N) to be predicted needs to be different for each vehicle in the present embodiment. The present embodiment employs a configuration of determining the value of N by determining a case where the magnitude of the vehicle interior noise is minimal while changing the value of N.

Specifically, at the point in time at which a value of k has reached a value of K (K is a natural number greater than k) with the repetitive execution of a learning process in which the prediction module 200 sets an initial value of N to k to train the prediction algorithm (k is a natural number), a generation process in which the prediction module 200 generates the predicted acceleration signal on the basis of the completely trained prediction algorithm, a verification process in which the prediction module 200 verifies the degree of learning of the prediction algorithm on the basis of the predicted acceleration signal, an ANC process in which the ANC module 300 performs ANC on the basis of the predicted acceleration signal, and a process in which the value of k is increased, a value of k corresponding to noise whose magnitude is the smallest among vehicle interior noises acquired in the ANC process may be determined as the value of N. An increment of the value of k may correspond to 1.

A case where k is 2, K is 5, and a vehicle interior noise signal is stored in an array variable S[k] will be described below as a specific example.
  i) First, the above-described learning process, generation process, verification process, and ANC process are performed in a state where N is initially set to 2, which is the value of k, and a vehicle interior noise signal measured in the ANC process is stored in S[2], and the value of k is increased to 3.
  ii) Next, in a state where N is set to 3 (increased value of k), the above-described learning process, generation process, verification process, and ANC process are performed, a vehicle interior noise signal measured in the ANC process is stored in S[3] and the value of k is increased to 4.
  iii) Next, in a state where N is set to 4 (increased value of k), the above-described learning process, generation process, verification process, and ANC process are performed, a vehicle interior noise signal measured in the ANC process is stored in S[4] and the value of k is increased to 5.
  iv) Since the value of k has reached 5 (value of K), the magnitudes of the vehicle interior noise signals S[2], S[3], and S[4] are compared, and when assuming a case where the magnitude of S[3] is minimal, the value of N is determined as 3.

The above process may be applied, for example, when the value of N is optimized according to the structure of a vehicle after the vehicle is shipped.

When the value of N is finally determined as above, the above-described prediction module 200 and ANC module 300 may operate according to the determined value of N, so that a predicted acceleration signal after the N samples compared to the point in time at which the reference acceleration signal is acquired (that is, the reference point in time described above) may be generated, ANC may be performed on the basis of the generated predicted acceleration signal, and accordingly, the fast response of R-ANC to road noise may be ensured not only in a low frequency region but also in a high frequency region.

Figure 5:
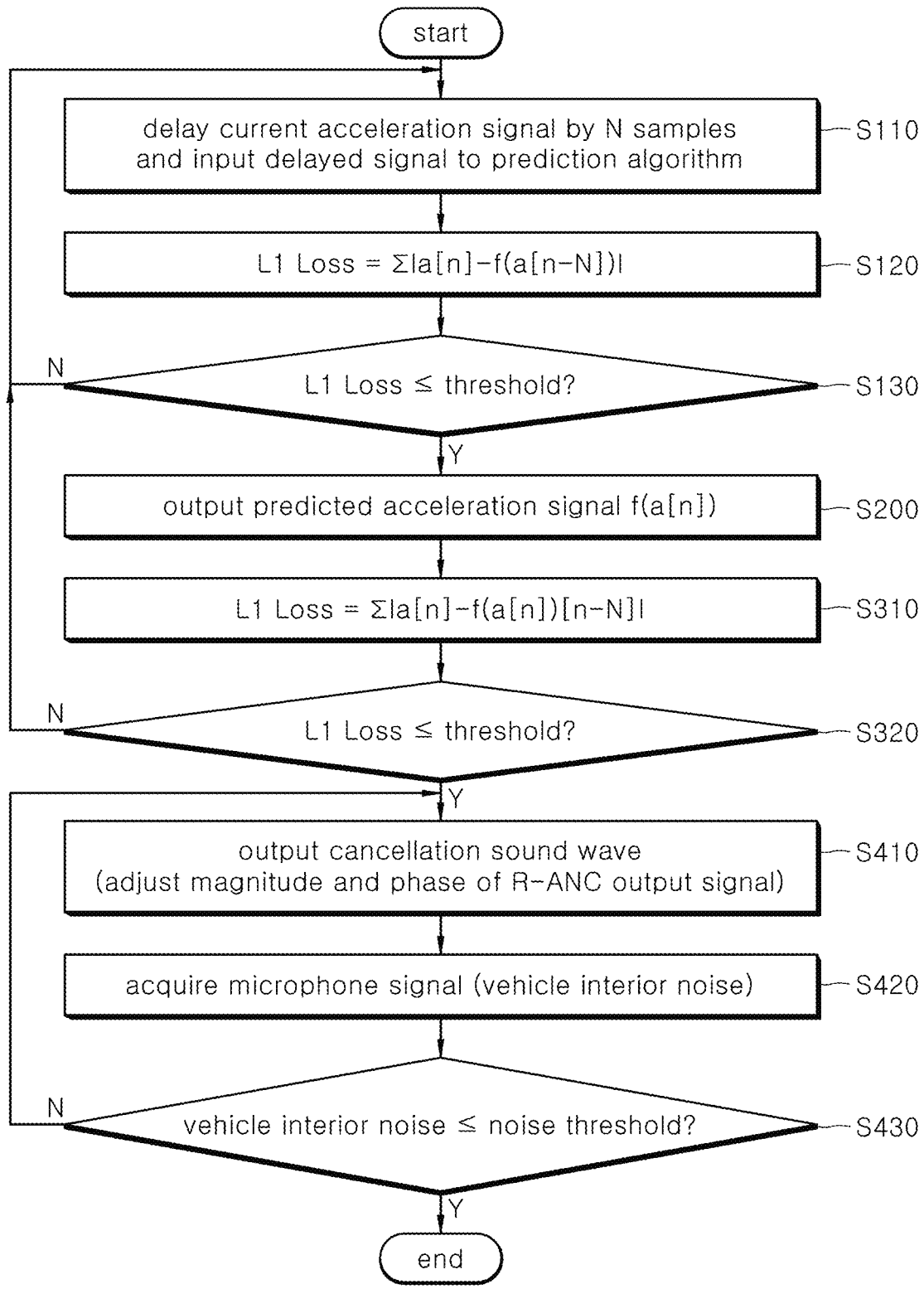
FIG. 5 and FIG. 6 are flowcharts illustrating a method for predicting an acceleration signal in accordance with the present embodiment.
Figure 6:
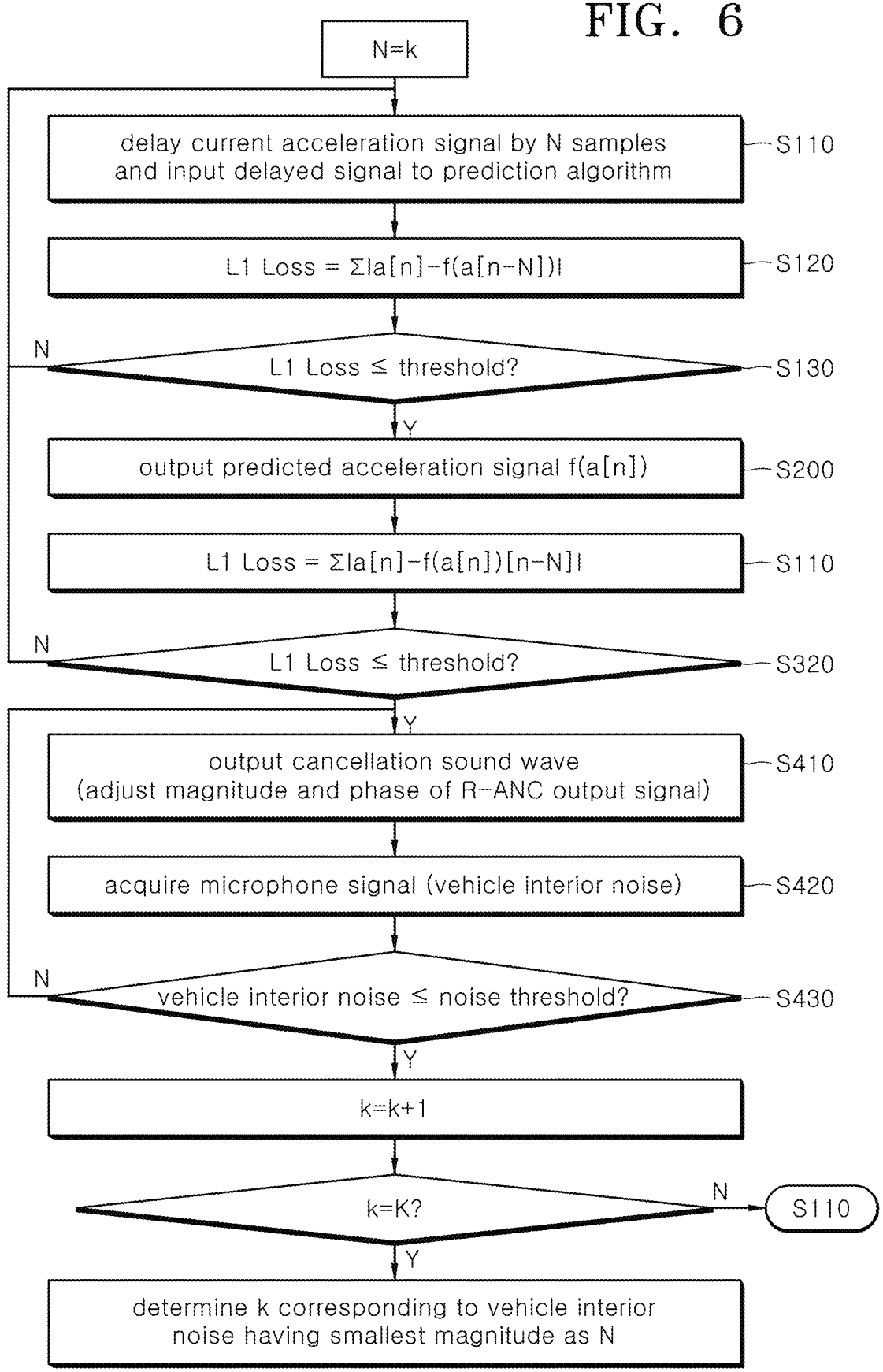

FIG. 5 and FIG. 6 are flowcharts illustrating a method for predicting an acceleration signal in accordance with the present embodiment. The method for predicting an acceleration signal in accordance with the present embodiment will be described with reference to FIG. 5 and FIG. 6, detailed descriptions of parts overlapping with those described above will be omitted, and the time-series configuration will be mainly described.

Referring to FIG. 5, first, the prediction module 200 trains the predefined prediction algorithm to predict an acceleration signal after N samples compared to the point in time at which an acceleration signal is acquired by the acceleration sensor 100 (S100). In step S100, the prediction module 200 delays, by N samples, the current acceleration signal acquired at the current point in time and inputs the delay signal to the prediction algorithm (S110), calculates the error parameter (L1 Loss) between the output acceleration signal output from the prediction algorithm and the current acceleration signal (S120), and determines whether the calculated error parameter is equal to or less than the preset threshold (S130). Steps S110, S120, and S130 are repeatedly performed until the error parameter is equal to or less than the threshold, and the weight of the prediction algorithm is updated so that the error parameter is reduced according to the stochastic gradient descent (SGD) through repeated steps S110, S120, and S130.

When the learning of the prediction algorithm is completed through step S100, the prediction module 200 applies the reference acceleration signal acquired at the reference point in time to the completely trained prediction algorithm and generates the predicted acceleration signal after the N samples compared to the reference point in time (S200).

Subsequently, the prediction module 200 verifies the degree of learning of the prediction algorithm on the basis of the predicted acceleration signal (S300). In step S300, the prediction module 200 delays, by N samples, the predicted acceleration signal output as the reference acceleration signal is input to the prediction algorithm, calculates the error parameter (L1 Loss) between the delayed signal and the reference acceleration signal (S310), and determines that the degree of learning of the prediction algorithm is verified when the calculated error parameter is equal to or less than the preset threshold (S320). When the error parameter exceeds the threshold in step S320, the prediction module 200 re-performs step S100 and the subsequent steps.

When the degree of learning of the prediction algorithm is verified through step S300, the ANC module 300 performs ANC on the basis of the predicted acceleration signal generated in step S200 (S400). In step S400, the ANC module 300 may generate a cancellation sound wave for canceling road noise reflected in the reference acceleration signal on the basis of the predicted acceleration signal, output the generated cancellation sound wave through the speaker (S410), acquire vehicle interior noise through the microphone (S420), and maintain the current cancellation sound wave output state when the acquired vehicle interior noise is equal to or less than the preset noise threshold (S430). When the vehicle interior noise exceeds the noise threshold in step S430, steps S410, S420, and S430 are performed again. That is, the magnitude and phase of the cancellation sound wave are adjusted through step S410 to regenerate the cancellation sound wave, and then the regenerated cancellation sound wave is output through the speaker. The vehicle interior noise is acquired through step S420, and is compared with the noise threshold through step S430. S410, S420, and S430 are repeatedly performed until the vehicle interior noise is equal to or less than the noise threshold.

As described above, the preset embodiment employs a configuration of determining the value of N by determining a case where the magnitude of the vehicle interior noise is minimal while changing the value of N, and in this process, steps S100, S110, S120, S200, S310, S320, S410, S420, and S430 described above may be applied as they are.

That is, as illustrated in FIG. 6, in a state in which the initial value of N is set to k, at the point in time at which the value of k has reached the value of K (k=K) as steps S100, S110, S120, S200, S310, S320, S410, S420, and S430 and the step of increasing the value of k by 1 (k=k+1) are repeatedly performed, a value of k corresponding to noise whose magnitude is the smallest among vehicle interior noises acquired in step S400 is determined as the value of N. When the value of N is finally determined, steps S100, S110, S120, S200, S310, S320, S410, S420, and S430 are subsequently performed according to the determined value of N, and accordingly, the fast response of R-ANC to road noise may be ensured not only in a low frequency region but also in a high frequency region.

Figure 7:
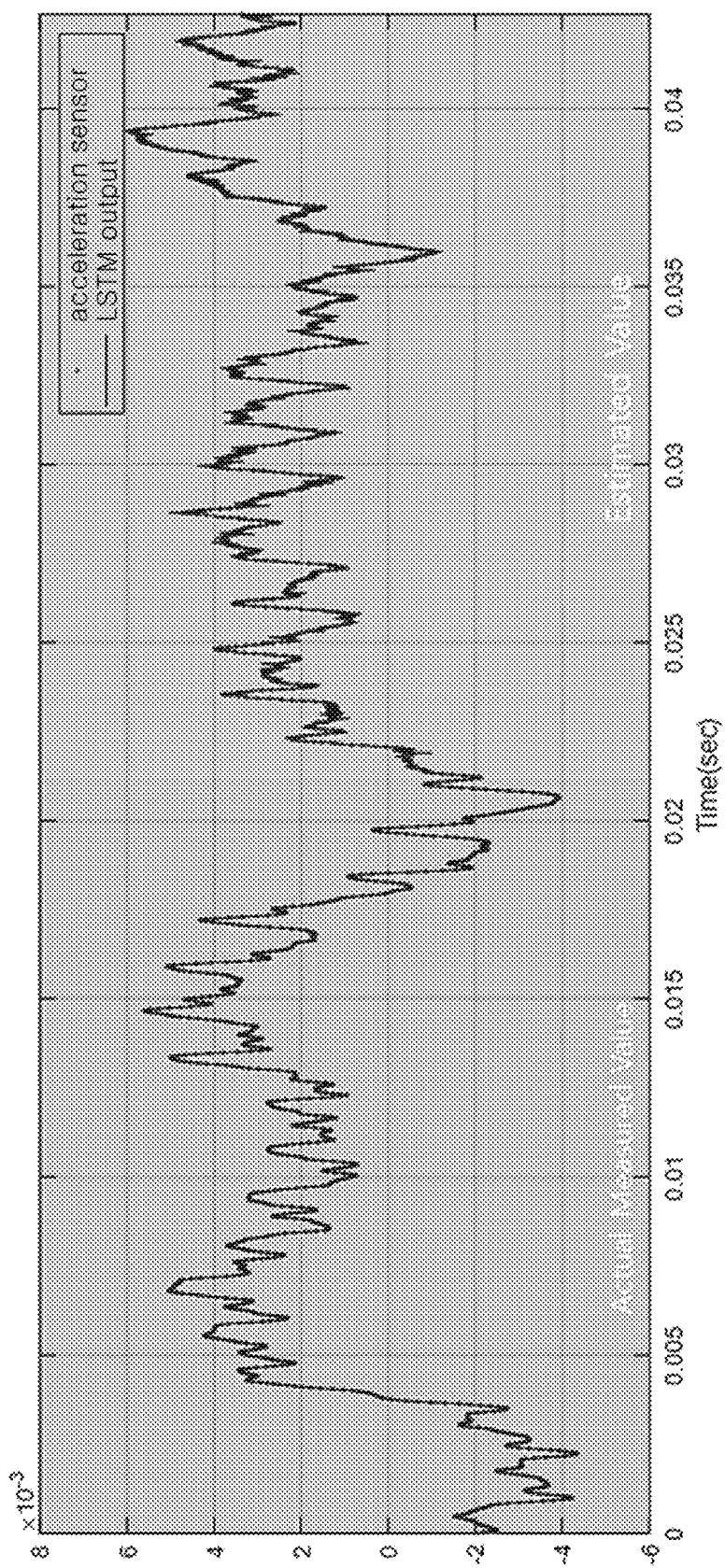
FIG. 7 is an exemplary diagram illustrating a result of predicting an acceleration signal through the apparatus and method for predicting an acceleration signal in accordance with the present embodiment.

FIG. 7 is an exemplary diagram illustrating a result of predicting an acceleration signal through the preset embodiment. When generating the predicted acceleration signal on the basis of the completely trained prediction algorithm, it may be confirmed that a signal change is accurately predicted although there is a small difference in noise level. Accordingly, the R-ANC response speed may be improved by predicting a change in the acceleration signal, so that road noise in a high frequency band may be effectively removed.

In this way, the preset embodiment predicts an acceleration signal on the basis of a prediction algorithm such as LSTM auto encoder and performs R-ANC, thereby ensuring the fast response of the R-ANC to changes in high-frequency component signals of 350 Hz or higher and improving vehicle quietness without additional hardware cost. Furthermore, even though vibration characteristics change according to the aging of a vehicle adopting the preset disclosure or the type of vehicle adopting the preset disclosure changes, the preset disclosure uses a method of optimizing the number of samples of acceleration signals to be predicted, thereby providing advantages in terms of application scalability and ensuring self-maintenance of an active road noise reduction function.

The term "module" used in the preset specification may include a unit implemented in hardware, software, or firmware, and for example, may be used interchangeably with terms such as logic, logic block, parts, or circuit. The module may be integrally formed parts, or a minimum unit or a part of the parts that perform one or more functions. For example, in accordance with an embodiment, the module may be implemented in the form of an application-specific integrated circuit (ASIC). Furthermore, the features described in the preset specification may be implemented as a method or process, an apparatus, a software program, a data stream or signal, for example. Although discussed only in the context of a single form of implementation (for example, discussed only as a method), the discussed features may also be implemented as other forms (for example, an apparatus or a program). The apparatus may be implemented as appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistant (PDA), and other devices that facilitate communication of information between end users.

What is claimed is:

1. An apparatus for predicting an acceleration signal of an acceleration sensor installed on a vehicle for active noise control (ANC), the apparatus comprising:

a prediction module configured to train a predefined prediction algorithm to predict an acceleration signal after N samples compared to a point in time at which an acceleration signal is acquired by the acceleration sensor, N being a natural number, and to apply a reference acceleration signal acquired at a reference point in time to the trained prediction algorithm to generate a predicted acceleration signal after the N samples compared to the reference point in time; and an ANC module configured to perform ANC based on the predicted acceleration signal.

2. The apparatus according to claim 1, wherein the N samples indicate a time required for road surface vibration reflected in the acceleration signal to be converted into sound waves and for the sound waves to reach an interior of the vehicle.

3. The apparatus according to claim 1, wherein the prediction module is configured to delay, by the N samples, a current acceleration signal obtained at a current point in time, input the delayed current acceleration signal to the prediction algorithm, and train the prediction algorithm by comparing an output acceleration signal output from the prediction algorithm with the current acceleration signal.

4. The apparatus according to claim 3, wherein the prediction module is configured to train the prediction algorithm through a method of updating a weight of the prediction algorithm so that an error parameter between the current acceleration signal and the output acceleration signal output from the prediction algorithm is reduced, based on stochastic gradient descent (SGD).

5. The apparatus according to claim 1, wherein, before the ANC is performed by the ANC module, the prediction module is configured to verify a degree of learning of the prediction algorithm by delaying, by the N samples, the predicted acceleration signal output as the reference acceleration signal is input to the prediction algorithm and calculate an error parameter between the delayed signal and the reference acceleration signal.

6. The apparatus according to claim 1, wherein the ANC module is configured to generate a cancellation sound wave for canceling road noise reflected in the reference acceleration signal based on the predicted acceleration signal, and output the generated cancellation sound wave.

7. The apparatus according to claim 1, wherein at a point in time at which a value of k has reached a value of K, K being a natural number greater than k, with the repetitive execution of a learning process in which the prediction module sets an initial value of N to k to train the prediction algorithm, k being a natural number, a generation process in which the prediction module generates the prediction acceleration signal based on the trained prediction algorithm, an ANC process in which the ANC module performs the ANC based on the predicted acceleration signal, and a process in which the value of k is increased, a value of k corresponding to a noise whose magnitude is the smallest among vehicle interior noises acquired in the ANC process is determined as a value of N.

8. The apparatus according to claim 1, wherein the prediction algorithm is implemented by a long short term memory (LSTM) auto encoder.

9. A method for predicting an acceleration signal of an acceleration sensor installed on a vehicle for active noise control (ANC), the method comprising:

training, by a prediction module, a predefined prediction algorithm to predict an acceleration signal after N samples compared to a point in time at which an acceleration signal is acquired by the acceleration sensor, N being a natural number;

applying, by the prediction module, a reference acceleration signal acquired at a reference point in time to the trained prediction algorithm to generate a predicted acceleration signal after the N samples compared to the reference point in time; and performing, by an ANC module, ANC based on the generated predicted acceleration signal.

10. The method according to claim 9, wherein the N samples indicate a time required for road surface vibration reflected in the acceleration signal to be converted into sound waves and for the sound waves to reach an interior of the vehicle.

11. The method according to claim 9, wherein, in training the predefined prediction algorithm, the prediction module delays, by the N samples, a current acceleration signal obtained at a current point in time, inputs the delayed current acceleration signal to the prediction algorithm, and trains the prediction algorithm by comparing an output acceleration signal output from the prediction algorithm with the current acceleration signal.

12. The method according to claim 11, wherein, in training the predefined prediction algorithm, the prediction module trains the prediction algorithm through a method of updating a weight of the prediction algorithm so that an error parameter between the current acceleration signal and the output acceleration signal output from the prediction algorithm is reduced, based on stochastic gradient descent (SGD).

13. The method according to claim 9, further comprising:
between generating the predicted acceleration signal and performing the ANC, verifying, by the prediction module, a degree of learning of the prediction algorithm by delaying, by the N samples, the predicted acceleration signal output as the reference acceleration signal is input to the prediction algorithm and calculating an error parameter between the delayed signal and the reference acceleration signal.

14. The method according to claim 9, wherein, in performing the ANC, the ANC module generates a cancellation sound wave for canceling road noise reflected in the reference acceleration signal based on the predicted acceleration signal, and outputs the generated cancellation sound wave.

15. The method according to claim 9, wherein at a point in time at which a value of k has reached a value of K, K being a natural number greater than k), during the training of the predefined prediction algorithm, generating the predicted acceleration signal, performing the ANC, and increasing the value of k are repeatedly performed in a state in which an initial value of N is set to k, a value of k corresponding to noise whose magnitude is the smallest among vehicle interior noises acquired in the step of performing the ANC is determined as a value of N.

16. The method according to claim 9, wherein the prediction algorithm is implemented by a long short term memory (LSTM) auto encoder.

* * * * *